United States Patent [19]

Lipschitz

[11] 4,421,321
[45] Dec. 20, 1983

[54] HYDRODYNAMIC NON-CONTACTING SEAL FOR ROTARY MACHINES

[76] Inventor: Abraham Lipschitz, 68 Jabotinsky St., Nahariya, Israel, 22385

[21] Appl. No.: 474,026

[22] Filed: Mar. 10, 1983

[30] Foreign Application Priority Data

Mar. 19, 1982 [IL] Israel ............................. 65289

[51] Int. Cl.³ ............................................. F16J 15/34
[52] U.S. Cl. ........................................ 277/3; 277/67; 277/96.1; 277/133
[58] Field of Search ............. 277/3, 67, 68, 69, 96.1, 277/133

[56] References Cited

U.S. PATENT DOCUMENTS

| | | | |
|---|---|---|---|
| 3,292,847 | 12/1966 | Herrick | 277/67 |
| 3,744,805 | 7/1973 | Heinrich | 277/133 |
| 3,937,477 | 2/1976 | Gyory | 277/67 |
| 4,076,259 | 2/1978 | Raimondi | 277/3 |
| 4,099,729 | 7/1978 | Mylykke | 277/96.1 |
| 4,212,475 | 7/1980 | Sedy | 277/96.1 |

Primary Examiner—Robert I. Smith
Attorney, Agent, or Firm—Bacon & Thomas

[57] ABSTRACT

A non-contacting, hydrodynamic end face seal in a machine comprises a disc-shaped rotor (1) attached to the machine shaft (2) and an annular stator (3) concentric with the rotor (1) and facing the rotor surface (11) at a small distance. From the stator surface (31) project a number of radially extending weirs (34) which form wedge-shaped gaps with the rotor surface, so formed that the gaps decrease in width in the direction of the velocity of the rotor surface (11) across the weirs, causing a hydrodynamic pressure to build up between the weir edges a and b. The outer end of each weir (34) is connected to the inner end of the adjacent weir (34), downstream thereof, by a diagonal ridge (35) of a height not exceeding the maximum height of the weirs (34), the ridges and weirs containing between them a high-pressure zone (HP). A rim (36) surrounds the weirs (34) and ridges (35) on their outside and projects from the stator surface (31) towards the rotor surface (11) to a height equal to the maximum height of the weirs (34), and thus forms a dam preventing liquid from escaping to the outside of the seal.

8 Claims, 8 Drawing Figures

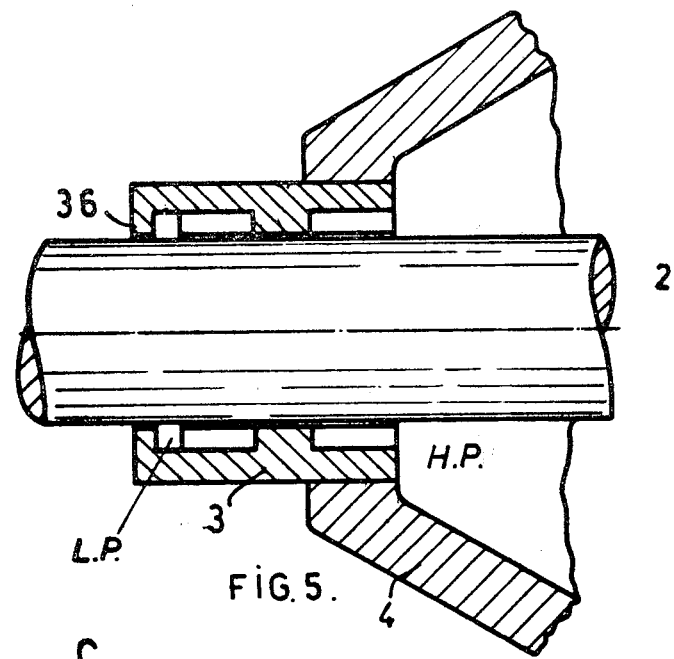
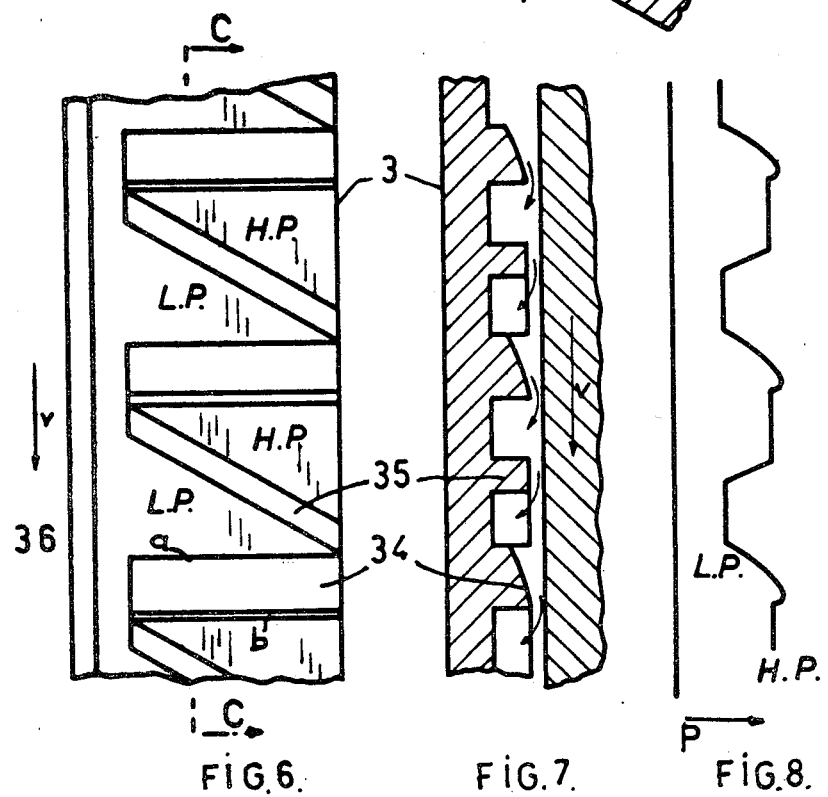

HYDRODYNAMIC NON-CONTACTING SEAL FOR ROTARY MACHINES

BACKGROUND OF THE INVENTION

The invention relates to a non-contacting hydrodynamic seal for rotary machines which can be applied both to shaft- and to end-face seals. It relates particularly to a seal with very low friction losses.

There exist two kinds of non-contacting seals up to date:
1. The labyrinth seal which consists of a plurality of interengaging circular cams and grooves respectively provided on the rotating and the stationary part of the machine,
2. The screw-type seal which comprises a projecting ridge wound around a rotating shaft with a narrow gap remaining between the stationary casing and the shaft, the seal operating in the fashion of an Archimedean Screw by pumping fluid towards the high-pressure side of the machine, and
3. The so-called film-riding seal wherein a rotating surface rides on a liquid or gas film of minute thickness and is controlled by pressure screws incorporated in the face design. This seal is useful where very high pressures are encountered, in machines wherein extreme temperatures and specific materials do not permit any rubbing contact.

A fourth kind of hydro-dynamic seal has been conceived lately which utilizes the fluid friction in a narrow gap between a moving and a stationary part to pump fluid into an area surrounded by a ridge of different height whereby the gap between the parts is larger in all points of the ridge where the relative velocity vector extends into that area, and smaller in all points where it extends out of the area.

Whilst the three first mentioned seals permit a certain percentage of fluid to escape into the open, there are not sufficient data available in respect to the third seal, so as to make an evaluation of its properties and its efficiency possible.

The invention is based on the mathematical theory of lubrication developed by Osborne Reynolds which has led, inter alia, to the understanding and construction of hydrodynamic bearings. A typical hydrodynamic thrust bearing comprises a flat, smooth rotor and a stator consisting of radially distributed pads, the surfaces of these pads being aligned so as to form a predetermined angle with the rotor surface. The motor velocity relative to the pad surface creates a high-pressure zone, associated with an enhanced flow rate, in the gap between the rotor and the pad surfaces.

This principle has been extended, although in different form from the construction of the aforesaid thrust bearings, to the design of both axial and radial seals for rotating machines wherein the outflow of a liquid through the gap between a rotating and a stationary part is to be prevented.

SUMMARY OF THE INVENTION

The hydrodynamic seal, according to the invention, separates a low-pressure space from a high-pressure space in a machine and comprises a rotor the smooth surface of which passes closely across a stator surface. The stator surface is provided with a plurality of spaced-apart, raised weirs extending between the low-pressure space and the high-pressure space substantially perpendicular to the velocity vector of the rotor surface; the weirs are of a predetermined length and breadth, their height above the stator surface increasing from a minimum at their upstream side to a maximum at their downstream side, thus forming wedge-shaped gaps with the rotor surface, the width of these gaps decreasing in downstream direction. The rotor surface drags liquid across the weirs, and a high pressure builds up towards the downstream end where the gap width is very small, the weirs being designed in such a manner that the pressure developed is not less than the liquid pressure in the machine space, at the design speed of the rotor.

The stator surface between each two weirs is divided into a high-pressure zone and a low-pressure zone by a ridge projecting out of the stator surface to a height not less than the greatest height of the weirs at their downstream ends; the ridge extends from the low-pressure end of one weir to the high-pressure end of the adjacent weir downstream thereof, whereby the high pressure zone communicates with the high-pressure space of the machine, and the low-pressure zone communicate with the low-pressure space, usually the atmosphere.

By applying this principle to an end face seal, this will comprise: a disc-shaped rotor rigidly attached to the machine shaft and rotating therewith; an annular stator surface concentric with the rotor and facing the rotor surface at a small distance. The aforedescribed weirs extend radially across the annular stator surface, and raised diagonal ridges connect the outer end of each weir with the inner end of the adjacent weir downstream thereof.

In a preferred embodiment of the end face seal the stator surface is axially translatable in respect of the machine housing and is urged towards the rotor surface by spring means to a point where the created pressure in the gap between the weirs and the rotor surface balances the force of the spring means. Hereby the gap width is controlled automatically in relation to the pressure differential, whereby a narrower gap provides a higher pressure in the high-pressure zones.

With a view to nimimize escape of the fluid to the outside, the low-pressure side of the seal is advantageously surrounded by a dam, preferably circular and concentric with the rotor and forming a gap with the rotor surface, the dam projecting out of the stator surface to a height not exceeding the maximum height of the weirs; the dam is slightly distanced from the ends of the weirs and the ridges at their meeting points in the low-pressure zone. The pressure in the space on the inside of the dam equals the ambient air pressure, and the dam thus prevents escape of fluid through the gap to the outside.

The dam also permits the seal to act as a face seal during standstill of the machine, due to the dam surface being pressed against the rotor surface by the spring means mentioned before, thereby closing the gap and constituting a solid barrier to the passage of fluid between rotor and stator surfaces.

The face seal, depending on the direction of the diagonal ridges can be applied to machines wherein the high-pressure prevails on the periphery of the seal, and the low pressure near the machine shaft and, vice versa, to machines wherein the high pressure prevails close to the shaft and the low pressure at the periphery of the seal rotor.

A shaft seal is constructed on the same principle. It contains a smooth shaft and a stator in the form of a hollow cylinder surrounding a predetermined length of the shaft. The inside surface of the stator cylinder is provided with longitudinal weirs extending from the high-pressure side to the low-pressure side. The stator surface between each two weirs is divided into a high-pressure zone and a low-pressure zone by a raised ridge of a height corresponding to the greatest height of the weirs, the ridges extending from the low-pressure side of each weir to the high-pressure side of the adjacent weir-downstream therefrom.

Here again, as in the case of the face seal, escape of fluid to the outside can be minimized by providing the stator cylinder of a shaft seal with an inwardly projecting collar on the low-pressure side, forming a narrow gap between the shaft and the stator cylinder which will usefully prevent fluid from being slung out by centrifugal forces. It is evident that in the space inside of the collar the low-pressure will be equal to the ambient atmospheric pressure, and for this reason no fluid will pass through the gap of the collar or dam owing to pressure differential, except of small quantities escaping by fluid creep.

It is not necessary that the height of the weirs increases gradually between a minimum and a maximum; to the contrary, the weir surface may be stepped between a low level to a high level close to the rotor surface, this shape resulting in a similar pressure increase as the former smoothly and gradually increasing surface. In addition, stepped surfaces are simpler to machine and are, therefore, less costly.

SHORT DESCRIPTION OF THE DRAWINGS

FIG. 1 is a section through an end face seal for a rotor rotating in the low-pressure zone of a machine, FIG. 2 is a section through the seal of FIG. 1 along the line A—A, FIG. 3 is a section through an end face seal similar to that illustrated in FIGS. 1 and 2, but designed for a rotor rotating in the high-pressure zone of a machine, FIG. 4 is a section through the seal of FIG. 3 along the line B—B, FIG. 5 is a longitudinal section through a shaft seal, FIG. 6 is a developed view of a portion of the inside of the stator of the shaft seal illustrated in FIG. 5, FIG. 7 is a section along the line C—C of FIG. 6, and FIG. 8 is a diagram of the pressure development along the line C—C of FIG. 6.

DESCRIPTION OF PREFERRED EMBODIMENTS OF THE INVENTION

Figure 1:
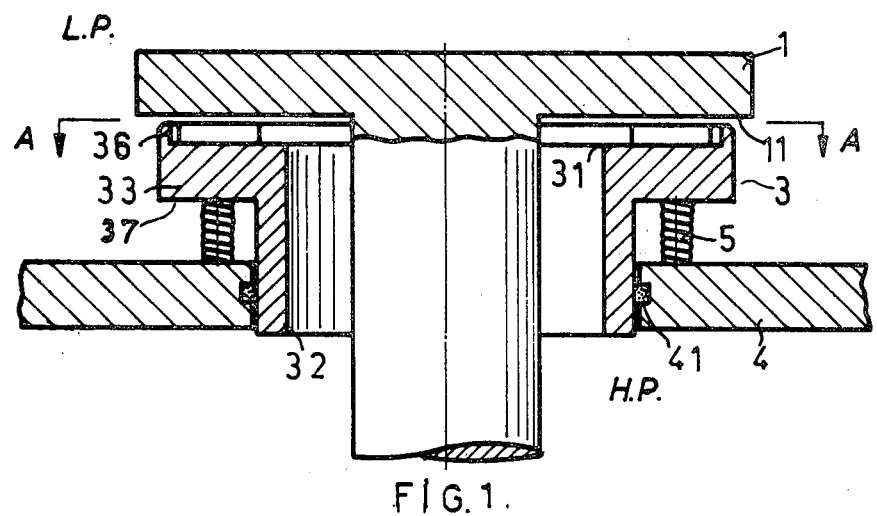
Figure 2:
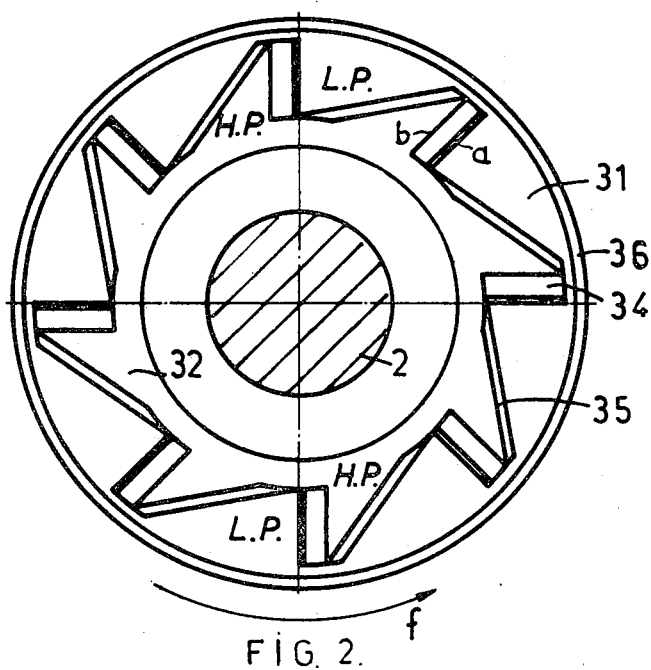

With reference to FIGS. 1 and 2, an end face seal comprises a disc-shaped rotor 1 integral with a rotating shaft 2, and a stator 3 axially movable in an opening in the machine housing 4. The rotor rotates within a low-pressure space, e.g. the atmosphere, and is provided with a smooth planar surface 11 opposite a stator surface 31. The stator consists of a cylindrical portion 32 and a flange-shaped portion 33, having its upper surface in close proximity to the rotor surface 11. The cylindrical portion is slidably movable in the housing 4 and is sealed against penetration of liquid by means of an oil retainer 41. Helical springs 5 are mounted between the underside of the flange 37 and the housing 4 and are adapted to urge the stator towards the rotor surface. The entire space inside the machine housing and inside the stator is filled by a liquid, at the higher pressure (HP) of the machine; the liquid to be sealed off may be oil, but in the case of pumps it may be water or any other liquid passing through the pump.

Figure 3:
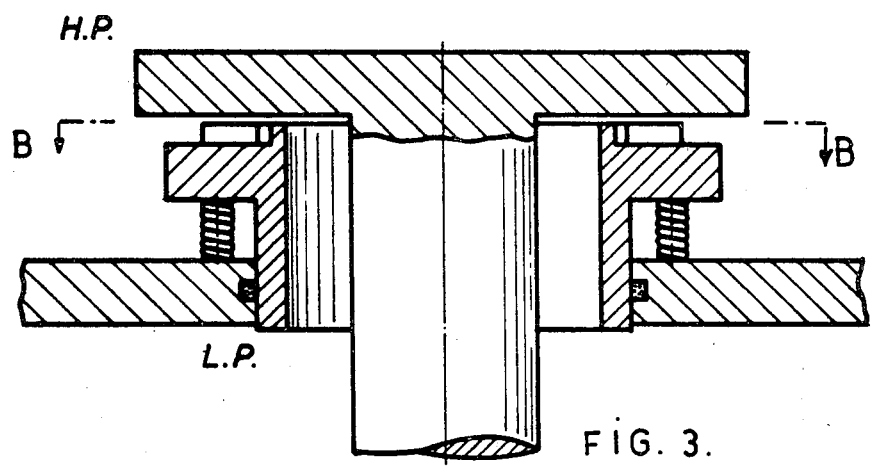
Figure 4:
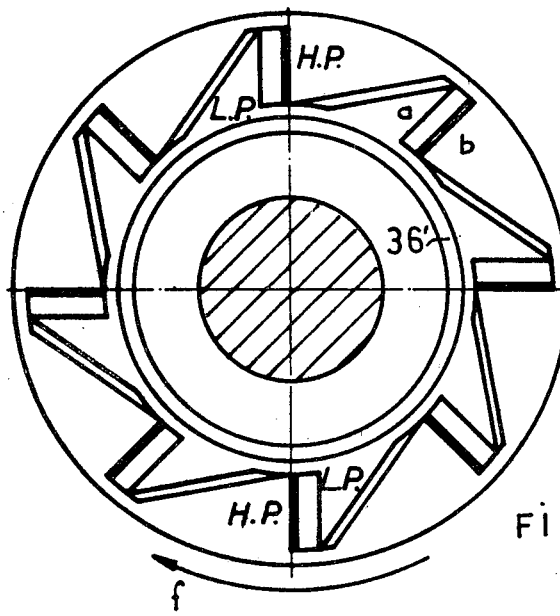

The stator surface 31 is shaped to form eight radial weirs 34 and eight diagonal ridges 35 extending from the outside end of each weir to the inside end of the following weir, assuming that the rotor rotates in the direction of the arrow f. Each weir is of a minimum height at its front or upstream edge a and of a maximum height at its rear or downstream edge b. (cf. FIGS. 6 and 7). The stator surface is surrounded by a rim 36 correpsonding in height to the maximum height of the weirs and the ridges and serves as a dam on the low-pressure side and as a static seal whenever the machine is stopped, owing to the closure of the gap between rotor and stator by means of the helical springs 5. FIGS. 3 and 4 illustrate a face seal identical with that shown in FIGS. 1 and 2, but designed for a machine wherein the rotor is in the high-pressure zone, while the machine shaft rotates in the low-pressure zone. It becomes evident from FIG. 4 that the weirs and ridges are laid out in the same alignment as in FIG. 2, but that the sense of rotation has been reversed from anit-clockwise in FIG. 2, to clockwise in FIG. 4, that the location of the upstream edges a and downstream edges b have been reversed, and that the circular dam 30 is placed along the inner edge of the seal, i.e. on the low-pressure side.

The shaft seal illustrated in FIGS. 5 and 7 comprises a shaft 2 having a smooth surface rotating inside a cylindrical stator housing 3 which is fastened inside a machine housing 4. The machine housing is filled with oil or another liquid at higher pressure (HP) than the atmospheric pressure (LP) on the outside of the stator. The cylinder of the stator housing 3 extends outwardly of the weirs and ridges and terminates in an inwardly projecting collar 35 slightly distanced from the ends of the weirs. The collar is of an inner diameter only slightly larger than the shaft diameter and serves as a dam preventing fluid from being thrown out of the seal into the open.

FIGS. 6 and 7 show the construction of the stator surface, projected into a plane which comprises spaced-apart weirs 34 and diagonally extending ridges 35 between each two weirs 34. The height of the weirs and the direction of their slope is chosen for a shaft velocity v as shown by the arrow. The surface velocity of the shaft drags liquid across the weir surface 34 building up a higher pressure than the pressure inside the machine housing if no liquid is to be permitted to penetrate to the outside across the weirs. Here as well as in the face seal the liquid volume dragged across each weir must be at least equivalent to the volume passing from the high-pressure zone to the low-pressure zone across the gap between the ridge 35 and the rotor surface. This volume is composed of two components, one being the volume dragged through this gap by the rotor velocity vector and the other the volume conveyed through the gap by the pressure differential. It is, therefore, of utmost importance to make this gap as small as possible by raising the ridges at least as high as the highest points of the weirs, although similar results will be obtained by lower ridges.

The pressure diagram of FIG. 8, read in conjunction with the section of FIG. 7 shows the pressure built up across each weir 34, its maintenance in the high-pressure zone (HP) and the pressure drop across the ridge 35 down to outside pressure (LP). Arrows show the motion of the liquid across the ridges and the weirs. Referring again to FIG. 6, it is understood that liquid under pressure fills all high-pressure zones (HP) of the shaft seal, and that the liquid carried across the ridges 35 into the low-pressure zones (LP) is returned to the HP-zones across the weirs by adhesion to the shaft surface which moves over the weirs at the velocity v. Liquid gathered in the space between the collar 36 and the weirs does not spill over the dam because of the narrow gap remaining between the collar and the shaft.

By designing a stator surface with several rows of weirs and ridges, a liquid at higher pressure can be contained than with a single row. In a shaft seal, there will be two or more rows of weirs and ridges one after the other, while with an end face seal two or more concentric rows will be provided on a stator surface of larger diameter, requiring a rotor of larger diameter as well.

It will be understood that the action of the hydrodynamic seals of the invention is based on the relative velocity between the rotor and the surface of the weirs and ridges. For this reason it is not absolutely necessary to provide a smooth rotor surface and a stator composed of weirs and ridges, but to reverse these features, by making the stator surface plane and smooth and by providing the ridges and weirs on the rotor. However, it appears that the aforedescribed embodiments are advantageous, especially with regard to shaft seals.

I claim:

1. A hydrodynamic seal for a rotary machine, adapted to separate a low-pressure space from a high-pressure space in said machine filled with a liquid, said seal comprising: a rotating member having its smooth surface passing across a stator surface in close proximity; said stator surface being provided with a plurality of spaced-apart weirs rising above said stator surface and extending between the low-pressure space and the high-pressure space substantially perpendicular to the velocity vector of said rotating member, said weirs, of a predetermined length and breadth, having their height above said stator surface increasing from a minimum at their upstream side to a maximum at their downstream side, each sector of said stator surface between adjacent weirs being divided into a high-pressure zone and a low-pressure zone by a ridge rising above said stator surface to a height not less than the maximum height of said weirs, and extending from the low-pressure end of each weir to the high-pressure end of the adjacent weir downstream thereof.

2. The hydrodynamic seal of claim 1, adapted to serve as an end face seal, comprising: a rotor rotatable with a machine shaft and being provided with a plane, circular and smooth flat surface opposite said stator surface; a stator provided with an annular planar surface from which rise a plurality of raidal weirs and an equivalent plurality of diagonal ridges connecting the outer end of each weir to the inner end of the adjacent weir downstream thereof.

3. The end face seal of claim 2, wherein said stator comprises a flange-shaped portion forming said annular planar surface and a cylindrical portion axially translatable in an opening of a machine casing, spring means being provided adapted to urge said stator surface towards said rotor surface.

4. The end face seal of claim 2, wherein said rotor surface is provided with a peripheral upstanding rim of a height substantially equivalent to the height of said diagonal ridges, said rim surrounding the low-pressure zone of said seal and being distanced from the meeting points of said weirs and said ridges.

5. The end face seal of claim 4, wherein said peripheral upstanding rim projects from the surface of said stator to a height equivalent to the maximum height of said weirs.

6. The hydrodynamic seal of claim 1, adapted to serve as a shaft seal, comprising a smooth machine shaft serving as rotor surface, and a stator in the shape of a hollow cylinder surrounding a predetermined length of said shaft, the inside surface of said stator being provided with raised weirs extending longitudinally from the high-pressure end to the low-pressure end of said cylinder, while the area between each two adjacent weirs is divided into a low-pressure zone and a high-pressure zone by a diagonal ridge extending from the low-pressure end of one weir to the high-pressure end of the adjacent weir downstream thereof.

7. The hydrodynamic shaft seal of claim 6, wherein said cylindrical stator is extended, at its low-pressure end, beyond the ends of said weirs and ridges and is provided with an inwardly extending collar, said collar forming a narrow gap with and around said shaft surface.

8. The end face seal of claim 3, separating a low-pressure space in the vicinity of said machine shaft from a high-pressure space surrounding said rotor periphery, comprising an upstanding rim projecting from said stator surface to the maximum height of said weirs and extending close to the inner edge of said annular stator surface.

* * * * *